METHOD OF DEPOSITING CONDUCTIVE IONS BY UTILIZING ELECTRON BEAM

Filed May 29, 1967

INVENTORS
FREDERICK M. GOLL
EDWIN C. BALDWIN

BY Paul M. Brasnahan

AGENT

United States Patent Office 3,516,855

Patented June 23, 1970

3,516,855

METHOD OF DEPOSITING CONDUCTIVE IONS BY UTILIZING ELECTRON BEAM

Frederick M. Goll, Reading, Pa., and Edwin C. Baldwin, Endicott, N.Y., assignors to International Business Machines Corporation, Armonk, N.Y., a corporation of New York Filed May 29, 1967, Ser. No. 642,013
Int. Cl. B44d *1/18;* C23c *13/02*
U.S. Cl. 117—212 4 Claims

ABSTRACT OF THE DISCLOSURE

A method of making an electrical conductive device of the printed circuit type in which metallic ions are supplied to lay down a conductive pattern at predetermined locations on a non-conductive substrate by the utilization of an electron beam which attracts and deposits positively ionized conductive particles along the path of the beam impinging on the non-conductive substrate.

BACKGROUND OF THE INVENTION

This invention relates to a method of producing electrical conductive devices, and more particularly to a method of making electrical conductive devices comprising a patterned metallic deposit upon a thin insulating type of substrate and which may include thin film resistors, capacitors and circuitry connections therebetween.

Vacuum deposition of metal for making of metallized electronic circuits or thin film resistors or capacitors has been utilized in the past as one method for generating electrical conductor devices in which thin coatings of conductive material are applied to a substrate. Certain of these prior arrangements require either that the metal pattern be predicated upon the use of masking arrangements which allow deposition of the films of metal in predetermined patterns or else utilize ionic deposition followed by evaporative techniques for supplying the additional metal to a seeding layer first provided by ionization.

SUMMARY OF THE INVENTION

The present invention is directed to an improved method of making electrical conductive patterns or devices in which the desired liquid or solid metal is volatilized in a vacuum chamber and this vapor is then directed beneath an electron beam gun. An electron beam which may be controlled for deflection is then directed through the volatilized particles, ionizing positively the particles in the path of the beam. The electrons remaining in the beam pass on and charge the substrate to a highly negative potential in the path of the directed beam. This high negative charge then attracts and deposits the positively ionized particles along the path of the directed beam. This arrangement provides an additive process for direct deposition of conductive or semi-conductive material on a suitable substrate with selective sizes and locations of the material and paths connecting particular points on the substrate.

A principal object of the invention is to provide an improved method of making an electrical conductive device.

Another object of the invention is to provide an improved method of making an electrical conductive device, in which a cloud of volatilized conductive material is generated, and is attracted to predetermined paths and locations on a substrate by a charge placed thereon by a controllable electron beam.

A further object of the invention is to provide an improved method of making an electrical conductive device of the type described in which the cloud of ionized particles is generated by an unfocused ion source.

Another object of the invention is to provide a method of manufacture of an electrical conductive device of the type described in which the beam of ions is focused and controlled to coincide upon the substrate with the electron beam.

In practicing the invention, the substrate is placed in a suitable vacuum chamber and a source of ions of the material to be deposited is arranged to provide a cloud or spray of ions directed toward the substrate. Also within the chamber an electron gun is arranged to provide a controlled and directed beam of high energy electrons to the substrate. The electron beam by impinging on the substrate provides a high negative charge concentration on the substrate along the path and width of the directed electron beam and the ionized particles are attracted thereto to provide conductive elements on the substrate.

DESCRIPTION OF THE DRAWINGS

In the drawings.

Similar reference characters refer to similar parts in each of the views.

Referring to FIG. 1 of the drawings, there is shown a vacuum chamber 1 evacuated by a vacuum pump 2, and containing therein a substrate 3 upon which a conductive pattern is to be provided, a liquid or solid volatile ion source 5, which is capable of producing a cloud of volatilized particles, an electron gun 7 which is arranged to supply an electron beam that can be focused and deflected by focusing and deflecting elements 9, under the control of suitable pattern control apparatus 11, whereby the resultant electron beam 13 may be moved about on the surface of the substrate. In operation, the desired liquid or solid conductive material is volatilized in the vacuum chamber to produce a cloud of volatilized particles through which the electron beam is directed toward the substrate. For example, metallic zinc can be evaporated by electrical resistance heating in a conventional boat or crucible, to produce a cloud of volatilized metallic particles. The particles are ionized positively by the passage of the electron beam through the cloud and the electrons remaining in the beam pass on and charge the substrate negatively along the path of the directed beam. The negative charge then attracts and deposits the positively ionized particles along the path of the directed beam. The motion of the electron beam with respect to the substrate is, of course, relative, and if desired, the electron beam may be held stationary and the substrate moved about in order to generate a pattern thereon.

FIG. 2 illustrates a second form of the invention in which the ions to be attracted to the substrate as a result of the electron beam charge are produced by an ion gun 17, which may take any one of a number of well known varieties, and which is arranged to provide a spray of ionized particles in the manner shown. These ions being positively charged will be attracted to those areas of the substrate that the electron beam 13 has charged negatively.

In FIG. 3 the ion gun 17 is additionally provided with suitable focusing and deflecting elements 19, governed by a pattern control 21, so that the ions are supplied to the substrate in a concentrated beam and are directed to the identical points where the electron beam 13 is charging the substrate to a negative value.

Figure 1:
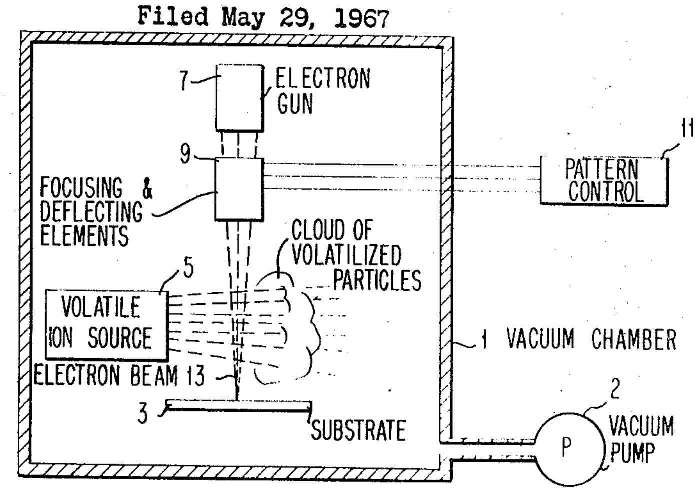
FIG. 1 shows in schematic form, one arrangement of the present invention in which a focused and directed electron beam and an ion source capable of providing a cloud of ions are provided.
Figure 2:
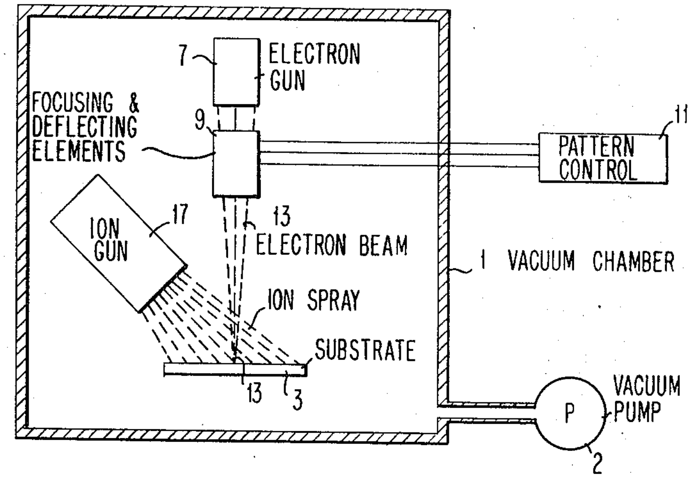
FIG. 2 is a schematic illustration of an arrangement according to the present invention in which a defocused ion gun is employed for an ion source.
Figure 3:
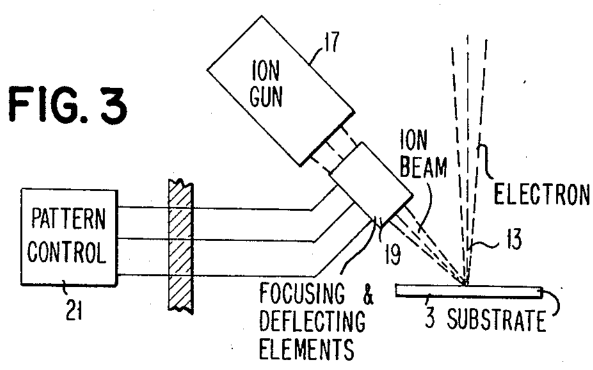
FIG. 3 shows a modification of the arrangement shown in FIG. 2.

From the foregoing, it will be apparent that the present invention provides an improved method of and means for generating conductive patterns on substrates by charging the desired area of the substrates to a suitable potential and supplying to the vicinity of the charge metallic ions which are attracted to the charged areas to thereby form a predetermined conductive pattern on the substrate.

While the invention has been particularly shown and described with reference to preferred embodiments thereof, it will be understood by those skilled in the art that various changes in form and details may be made therein without departing from the spirit and scope of the invention.

What is claimed is:

1. The method of making an electrical conductive pattern on a non-conductive substrate, comprising the steps of:

(a) supplying conductive ions to the vicinity of the surface of said substrate on which the conductive pattern is to be provided (b) exposing the surface of said substrate to an electron beam along a pattern and charging the surface of said substrate along said pattern to a negative potential which attracts said ions.

2. The method of making an electrical conductive pattern on a non-conductive substrate according to claim 1, wherein said conductive ions are supplied from a volatile ion source to form a cloud of ions in the vicinity of the surface of said substrate.

3. The method of making an electrical conductive pattern on a non-conductive substrate according to claim 1, wherein said conductive ions are supplied from an ion gun to form a cloud of ions in the vicinity of the surface of said substrate.

4. The method of making an electrical conductive pattern on a non-conductive substrate according to claim 1, wherein said conductive ions are supplied in a focused and deflectable beam from an ion gun, to trace a pattern on said substrate congruent with the pattern traced by said electron beam.

References Cited

UNITED STATES PATENTS

| | | | |
|---|---|---|---|
| 3,419,487 | 12/1968 | Robbins et al. ---- | 117—93.3 X |
| 3,303,319 | 2/1967 | Steigerwald ------- | 219—121 X |
| 3,117,022 | 1/1964 | Bronson et al. ---- | 117—93.3 X |

ALFRED L. LEAVITT, Primary Examiner

A. M. GRIMALDI, Assistant Examiner

U.S. Cl. X.R.

117—93.3, 107